Patented Aug. 1, 1950

2,517,097

UNITED STATES PATENT OFFICE 2,517,097

MANUFACTURE OF CELLULOSE ESTERS

Charles Doras, Dijon, France, assignor to Societe Rhodiaceta, Paris, France, a French company No Drawing. Application March 8, 1950, Serial No. 148,520. In France February 8, 1946

9 Claims. (Cl. 260—225)

The present invention relates to the manufacture of cellulose esters by processes in which the esterified cellulose is soluble in the esterification mixture and it has particular relation to the manufacture of cellulose esters which contain at least one acyl radical containing more than four carbon atoms.

In the previously known esterification processes of the above mentioned type, the ester produced dissolves in the esterification mixture and remains in this solution until the end of the esterification so that the first portions of the ester to be formed remain subjected to the action of the reagents until the whole of the cellulose has become esterified and dissolved. As a consequence of this, the first and major part of the cellulose ester formed undergoes a degradation which is harmful to the quality of the products prepared from such esters.

According to the present invention cellulose is esterified by means of an esterification bath capable of dissolving the cellulose derivative formed, but, in contrast to the before-mentioned known processes, as the cellulose derivative is formed and goes into solution, this solution is separated from the rest of the reaction mass and subjected to a treatment which prevents appreciable degradation of the cellulose derivative already formed, whereas in the non-completely esterified and undissolved residue the reaction continues until esterification and solubilization of the whole of the cellulose takes place.

In order to stop the reaction in the solution of the esterified product and to prevent the before-mentioned degradation of the ester, any known method can be used, such as for example destruction of the excess of the esterifying reagent or destruction of the reaction catalyst.

In carrying out the process of the present invention, the esterifying bath can be brought in contact with the cellulose in any suitable apparatus, for example an apparatus containing a filtering device, through which the solution of the cellulose ester formed can be passed, in which, however, those cellulosic fibres which have not been completely esterified yet, are retained. These fibres are swollen and impregnated by the esterification mixture and remain, therefore, exposed to reaction of the esterifying agents so that their esterification continues. As soon as the cellulose ester is formed, it passes into solution and this solution then emerges from the filtering device and is treated to stop further reaction in the solution. Meanwhile the reaction in the residue goes on until all the cellulose which has been introduced into the reaction mixture is esterified and goes into solution as esterification proceeds.

The apparatus of the above mentioned type used for the separation of cellulose ester solution from the undissolved, not completely esterified cellulose material may, for example, consist of a system of wire gauze or filters consisting of textile materials resistant to the esterification bath, layers of sand, metallic turnings or Raschig rings or the like.

The invention may be applied to continuous esterification processes and also to discontinuous operation.

The following examples illustrate the method of the invention by way of example without limiting it in any respect. The parts are by weight unless otherwise stated.

Example 1

A continuously prepared mixture containing
100 parts of cellulose previously subjected to a usual pretreatment with 50 parts of acetic acid of 100%
200 parts of caproic acid ($C_6H_{12}O_2$)
250 parts acetic anhydride, and
14 parts of concentrated sulfuric acid, is subjected to beginning acetylation during a period of 10 minutes in an apparatus for continuous acetylation of the type described in U. S. Patent No. 1,859,579. The fibrous mixture emerging from this apparatus is supplied by means of a piston pump under a pressure of 45–50 kg. per square cm to a column containing stacks of wire gauze of increasingly fine mesh, the first portions having a mesh of 2 to the square cm. and the last portions of 10,000 to 12,000 per square cm. The fibres which have not reacted completely yet are thus retained and continue to react, while the homogeneous liquid consisting of a solution of the cellulose derivative formed in the esterifying bath is passed through the filter system.

The tri-ester solution emerging from the column is mixed immediately with ⅓ of its weight of acetic acid of 60%. It is than subjected to ripening and finally precipitated by the addition of water.

The cellulose aceto-caproate thus obtained has very satisfactory properties and is distinguished from an aceto-caproate obtained under otherwise equal conditions in a known manner, i. e. without the application of the fractional withdrawal according to the present invention of solution of the reaction product formed, by a substantially increased viscosity of solutions of the end product in organic solvents.

Example 2

100 parts of cellulose are pretreated for 30 minutes at about 25° C. with 50 parts of acetic acid of 100%, containing 1 part of sulfuric acid. The cellulose thus pretreated is passed continuously through an apparatus which is provided with a stirrer and into which the following two mixtures are supplied separately:

*Mixture 1:*

200 parts of acetic anhydride,
    100 parts of stearic acid ($C_{18}H_{36}O_2$), and
    250 parts of acetic acid of 100%.

*Mixture 2:*

100 parts of acetic acid of 100%,
    8 parts sulfuric acid of 66° Bé., and
    3 parts of perchloric acid of 65%.

The pasty mass thus obtained is continuously introduced into and passed through a column provided with a filtering network similar to that described in Example 1, by means of a pump substantially in the manner described in Example 1.

The solution emerging from this column is mixed with acetic acid of 60% in order to stop the reaction in the mixture, and is then subjected in a known manner to a ripening treatment until an acetone-soluble cellulose aceto-stearate is formed.

Example 3

100 parts of cellulose are pretreated for 30 minutes at about 25° C. with 50 parts of acetic acid of 100%, containing 1 part of sulfuric acid. The cellulose thus pretreated is passed continuously through an apparatus which is provided with a stirrer and into which the following two mixtures are supplied separately:

*Mixture 1:*

200 parts of acetic anhydride,
    70 parts of lauric acid ($C_{12}H_{24}O_2$), and
    250 parts of acetic acid of 100%.

*Mixture 2:*

100 parts of acetic acid of 100%,
    8 parts of sulfuric acid of 66° Bé., and
    3 parts of perchloric acid of 65%.

The pasty mass thus obtained is now further treated and an acetone-soluble cellulose aceto-laurate is obtained in the manner described in the preparation of cellulose aceto-stearate in Example 2.

Example 4

100 parts of cellulose are pretreated for 30 minutes at about 25° C. with 50 parts of acetic acid of 100%, containing 1 part of sulfuric acid. The cellulose thus pretreated is passed continuously through an apparatus which is provided with a stirrer and into which the following two mixtures are supplied separately:

*Mixture 1:*

200 parts of acetic anhydride,
    90 parts of palmitic acid ($C_{16}H_{32}O_2$)
    250 parts of acetic acid of 100%.

*Mixture 2:*

100 parts of acetic acid of 100%,
    8 parts of sulfuric acid of 66° Bé., and
    3 parts of perchloric acid of 65%.

The pasty mass thus obtained is now further treated and an acetone-soluble cellulose aceto-palmitate is obtained in the manner described in the preparation of cellulose stearate in Example 2.

The cellulose esters obtained according to Examples 2, 3 and 4 are distinguished by the absence of degradation demonstrated by increased viscosity of their solutions in comparison to products prepared under otherwise equal conditions but without the application of the present invention.

Example 5

A mixture of the following composition is introduced by continuous supply into a mixing device provided with a stirrer and capable of being heated by means of a double wall, the temperature being maintained at 55° C.:

| | Parts |
|---|---|
| Cellulose | 100 |
| Monochloroacetic acid | 25 |
| Palmitic anhydride | 1400 |
| Carbon tetrachloride | 1300 |

The mass removed from the lower part of this mixer is introduced by means of a helical pump into a second apparatus which is maintained at a temperature of 60° C. and in which 80 parts of methanesulfonic acid are added in a continuous manner.

The advance of the reaction mass from top to bottom of this second apparatus is regulated by means of an agitator of suitable design. Subsequently, the mass is introduced into a filtering network similar to that used according to the above Example 1, maintained at a temperature of 65° C.

The clear solution of cellulose tripalmitate thus obtained is precipitated by the addition of water in proportion as it emerges from the filtering network. It is an undegraded product of high viscosity.

Example 6

A reaction mixture is continuously prepared by mixing the following ingredients in the following proportions:

| | Parts by weight |
|---|---|
| Myristic acid ($C_{14}H_{28}O_2$) | 250 |
| Cotton pretreated in customary manner | 40 |
| Chloroacetic anhydride | 600 |
| Magnesium perchlorate | 1.5 |

Esterification of the cotton cellulose in this mixture is carried out at 60°–65° C. substantially in the manner described in the above Example 1.

Example 7

An esterification mixture is continuously prepared and treated in a manner in every respect analogous to that described in Example 5 from the following ingredients:

500 lbs. ethoxy acetic anhydride,
    200 lbs. acetic anhydride,
    700 lbs. stearic acid,
    2 lbs. paratoluene sulfochloride,
    100 lbs. cellulose pretreated in the usual manner.

Example 8

A reaction mixture is continuously prepared by mixing the following ingredients in the following proportions:

| | Parts by weight |
|---|---|
| Pelargonic acid ($C_9H_{18}O_2$) | 250 |
| Cellulose pretreated in customary manner | 50 |
| Chloracetic anhydride | 600 |
| Magnesium perchlorate | 1.5 |

Esterification is carried out at 60°–65° C. by following the procedure described in the above Example 1.

*Example 9*

An esterification mixture is continuously prepared and treated in the manner described in Example 1, from the following ingredients:

700 lbs. propoxy acetic anhydride
200 lbs. acetic anhydride
700 lbs. stearic acid
100 lbs. molten zinc chloride, and
100 lbs. cellulose pretreated in customary manner.

As mentioned in Examples 6–9, the process steps followed in these esterifications are analogous to those described in Examples 1–5, i. e. completely esterified and dissolved cellulose is separated from the reaction mixture, while in the latter esterification is continued until all cellulose is completely esterified and dissolved. The separated cellulose ester solution is subjected to precipitation neutralization of the catalyst or the like in order to prevent degradation of the cellulose ester. The esters obtained according to Examples 6–9 are likewise distinguished by high quality, particularly high viscosity of their solutions.

As shown by the above examples, in carrying out the present invention any fatty acid having in the molecule more than 4 carbon atoms, particularly 5 to 18 carbon atoms, may be used, if desired in combination with other lower or higher fatty acids.

It will be understood that this invention is not limited to the specific steps, substances and conditions described above and may be carried out with various modifications without departing from the scope of the invention as defined in the appended claims.

Reference is made to my co-pending application Ser. No. 725,284, filed on January 30, 1947, of which this is a continuation-in-part.

What is claimed is:

1. A method of producing a cellulose ester containing at least one higher aliphatic acyl radical by mixing cellulose with an esterifying liquid comprising the anhydride of an aliphatic acid, an aliphatic acid and a catalyst, at least one of these acids being a higher aliphatic acid; removing during esterification from the reaction mixture containing incompletely esterified undissolved cellulose and dissolved cellulose ester, esterification of which is completed, solution of said cellulose ester; rendering the removed solution incapable of causing degradation of the cellulose ester dissolved therein and continuing esterification in the reaction mixture.

2. A method of producing cellulose acetostearate by mixing cellulose with an esterifying liquid consisting of acetic anhydride, stearic acid, acetic acid and a catalyst; removing during esterification from the reaction mixture containing incompletely esterified undissolved cellulose and dissolved cellulose ester esterification of which is completed, solution of said cellulose ester; rendering the removed solution incapable of causing degradation of the cellulose ester dissolved therein and continuing esterification in the reaction mixture.

3. In a process for producing a cellulose ester containing at least one aliphatic acyl radical according to the solution type process, the steps of continuously supplying a mixture of cellulose with an esterifying liquid comprising the anhydride of an aliphatic acid, an aliphatic acid and a catalyst, at least one of these acids being a higher aliphatic acid, to a reaction mixture of cellulose and said esterifying liquid; continuously removing from said reaction mixture containing incompletely esterified, undissolved cellulose and dissolved cellulose ester, esterification of which is completed, solution of said cellulose ester; rendering the removed solution incapable of causing degradation of the cellulose ester dissolved therein and continuing esterification in the reaction mixture.

4. In a process for producing cellulose acetostearate according to the solution type process, the steps of continuously supplying a mixture of cellulose with an esterifying liquid consisting of acetic anhydride, stearic acid, acetic acid, and a catalyst, to a reaction mixture of cellulose and said esterifying liquid; continuously removing from said reaction mixture containing incompletely esterified, undissolved cellulose and dissolved cellulose ester, esterification of which is completed, solution, of said cellulose ester; rendering the removed solution incapable of causing degradation of the cellulose ester dissolved therein and continuing esterification in the reaction mixture.

5. In a process of producing cellulose tripalmitate, the steps of continuously supplying a mixture of cellulose with an esterifying liquid consisting of monochloracetic acid, palmitic anhydride and carbon tetrachloride together with an esterification catalyst to a reaction mixture of cellulose and said esterifying liquid, continuously removing from said reaction mixture containing incompletely esterified, undissolved cellulose and dissolved cellulose ester, esterification of which is completed, solution of said cellulose ester; rendering the removed solution incapable of causing degradation of the cellulose ester dissolved therein and continuing esterification in the reaction mixture.

6. A method as claimed in claim 1, in which removal of the cellulose ester solution is effected by filtration of the reaction mixture.

7. A method as claimed in claim 1, in which removal of the cellulose ester solution is effected by subjecting the reaction mixture to centrifuging.

8. A method as claimed in claim 1, in which the separated solution of the cellulose ester is treated with a precipitating agent for said ester immediately after separation.

9. A method as claimed in claim 1, in which the separated solution of the cellulose ester is subjected to a ripening treatment before precipitation.

CHARLES DORAS.

No references cited.